United States Patent
Coenen et al.

(10) Patent No.: US 12,209,658 B2
(45) Date of Patent: Jan. 28, 2025

(54) ELECTRIC POWER SHIFT TRANSMISSION AND POWER SHIFT METHOD

(71) Applicant: Dana Belgium N.V., Flanders (BE)

(72) Inventors: Pauwel Coenen, Aalter (BE); Joachim Van Dingenen, Drongen (BE); Christophe De Buyser, Veldegem (BE); Kurt Cattoor, Koolkerke (BE); Bert Hannon, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 139 days.

(21) Appl. No.: 18/146,734

(22) Filed: Dec. 27, 2022

(65) Prior Publication Data

US 2024/0209935 A1 Jun. 27, 2024

(51) Int. Cl.
- *F16H 61/688* (2006.01)
- *F16H 3/00* (2006.01)
- *F16H 61/04* (2006.01)

(52) U.S. Cl.
CPC ........... *F16H 61/688* (2013.01); *F16H 3/006* (2013.01); *F16H 61/04* (2013.01); *F16H 2061/0425* (2013.01); *F16H 2200/0034* (2013.01); *F16H 2306/44* (2013.01); *F16H 2306/52* (2013.01)

(58) Field of Classification Search
CPC .................. F16H 61/688; F16H 61/04; F16H 2061/0425; F16H 3/006; F16H 2200/0034; F16H 2200/0021; F16H 2306/44; F16H 2306/52
See application file for complete search history.

(56) References Cited

U.S. PATENT DOCUMENTS

| | | |
|---|---|---|
| 6,832,978 B2 | 12/2004 | Buchanan et al. |
| 8,882,632 B2 | 11/2014 | Kumazaki et al. |
| 9,109,693 B2 | 8/2015 | Lee et al. |
| 10,618,520 B2 | 4/2020 | Hansson et al. |
| 11,933,398 B2 * | 3/2024 | Mori ................ F16H 63/3043 |
| 2015/0375750 A1 * | 12/2015 | Toyota .................. F16H 61/16 701/48 |
| 2016/0017958 A1 * | 1/2016 | Wu ........................ F16H 3/006 74/665 D |
| 2017/0037936 A1 * | 2/2017 | Park ...................... F16H 3/089 |
| 2022/0065331 A1 | 3/2022 | Van Dingenen et al. |

FOREIGN PATENT DOCUMENTS

CN 107131296 A 9/2017

* cited by examiner

*Primary Examiner* — Huan Le
(74) *Attorney, Agent, or Firm* — McCoy Russell LLP (57) ABSTRACT

Systems and methods for an electric powertrain. The method, in one example, includes responsive to receiving a shift command, engaging a second friction clutch while disengaging a first friction clutch to transition from a first operating gear ratio to a second operating gear ratio. The method, further includes during the gear ratio transition, operating a traction motor under a peak condition, the peak condition denotes a condition where the motor speed is greater than a maximum continuous torque curve of the motor.

20 Claims, 6 Drawing Sheets

| | First Gear | Second Gear |
|---|---|---|
| First Friction Clutch (128) | Engaged | Disengaged |
| Second Friction Clutch (126) | Disengaged | Engaged |

| | First Gear | Second Gear |
|---|---|---|
| First Friction Clutch (234) | Engaged | Disengaged |
| Second Friction Clutch (232) | Disengaged | Engaged |
| First Synchronizer (230) | Engaged | Disengaged |
| Second Synchronizer (228) | Disengaged | Engaged |

ELECTRIC POWER SHIFT TRANSMISSION AND POWER SHIFT METHOD

TECHNICAL FIELD

The present disclosure relates to an electric powertrain with a transmission that is designed to implement power shifts with decreased torque interruption.

BACKGROUND AND SUMMARY

Automatic power shift transmissions have been used in vehicle powertrains to increase shifting performance by diminishing torque interruptions during shifting transients. Specifically, some previous transmissions have made attempts to reduce torque changes, and consequently speed changes, at the transmission's output during shifting events.

One example, of a power shift transmission in an internal combustion engine powertrain is disclosed in U.S. Pat. No. 6,832,978 B2 to Buchanan et al. In Buchanan's powertrain, torque transfer and slip through a pair of clutches is controlled during a shift in an attempt to reduce torque interruptions.

The inventors have recognized several issues with Buchanan's shifting technique as well as other previous power shifting strategies in both motor and engine driven transmissions. For instance, due to the constraints of the prime mover, which in many cases is an internal combustion engine, the output torque cannot be held constant during shifting operation. This is referred to as a torque dip and the factor by which the torque is decreased during a shift may be approximately inversely proportional to the gear ratio spread (~1/spread). The gear ratio spread is the ratio between the higher gear ratio and the lower gear ratio involved in the shift. However, many electric transmissions have a wider gear ratio spread than engine driven transmissions due to the capabilities of electric motors particularly with regard to their power bands. As a result, the torque dip issue is exacerbated.

The inventors have recognized the aforementioned issues and developed a method for operation of an electric powertrain system to overcome at least a portion of the issues. The method includes receiving a shift command to initiate a shift event. The method further includes, in response to receiving the shift command, engaging a second friction clutch while disengaging a first friction clutch to transition from a first operating gear ratio to a second operating gear ratio. The method further includes during the gear ratio transition, operating a traction motor under a peak condition. The peak condition denotes an operating condition in which a torque of the traction motor exceeds a maximum continuous torque threshold. The method may further include, subsequent to the shift event, decreasing a torque of the traction motor to operate the traction motor at or below the maximum continuous torque threshold. In this way, the traction motor is transiently peaked during a power shift to increase shifting performance by decreasing torque interruptions during shifting. In one example, the motor peaking may specifically be controlled to maintain a transmission output torque at a substantially constant value during the torque hand over of the clutches. In this way, interruptions during the shift event are avoided.

In one example, the transmission may further include a first synchronizer that is directly coupled to the first friction clutch and a second synchronizer that is directly coupled to the second friction clutch. In such an example, the method further includes, prior to engaging the first friction clutch while disengaging the second friction clutch, engaging the first synchronizer while sustaining engagement of the second synchronizer until the second clutch is fully open and subsequent to engaging the second friction clutch while disengaging the first friction clutch, disengaging the first synchronizer while sustaining engagement of the second synchronizer. Using and operating the synchronizers in this manner allow the drag losses on the friction clutches to be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

In a power shift transmission it is desirable to decrease torque changes, and consequently speed changes, at the output during shifting. However prior transmissions are not capable of maintaining a constant output torque during shifting transients. This is referred to as a torque dip. The factor by which the torque is decreased during a shift may be inversely proportional to the gear ratio spread. The gear ratio spread is defined as the ratio between the higher gear ratio and the lower gear ratio of the shift. For instance, in case of a shift from first to second gear, the ratio spread is defined by the ratio of a first gear ratio to a second gear ratio. In one prior example of an electric transmission, the spread may be larger (e.g., 2.75 in one specific use-case example) than the spread in some combustion engine driven transmissions (e.g., 1.3-1.8 in a specific use-case example). Therefore, many previous power shift electric transmission have a higher torque dip than prior engine powered transmissions, leading to a decreased shift quality. The power shift transmission systems and operating methods described herein aim to increase shift quality by transiently peaking a traction motor to diminish torque interruptions and maintain a substantially constant transmission output torque during power shifting events, in some cases. Consequently, transmission performance is increased.

Figure 1A:
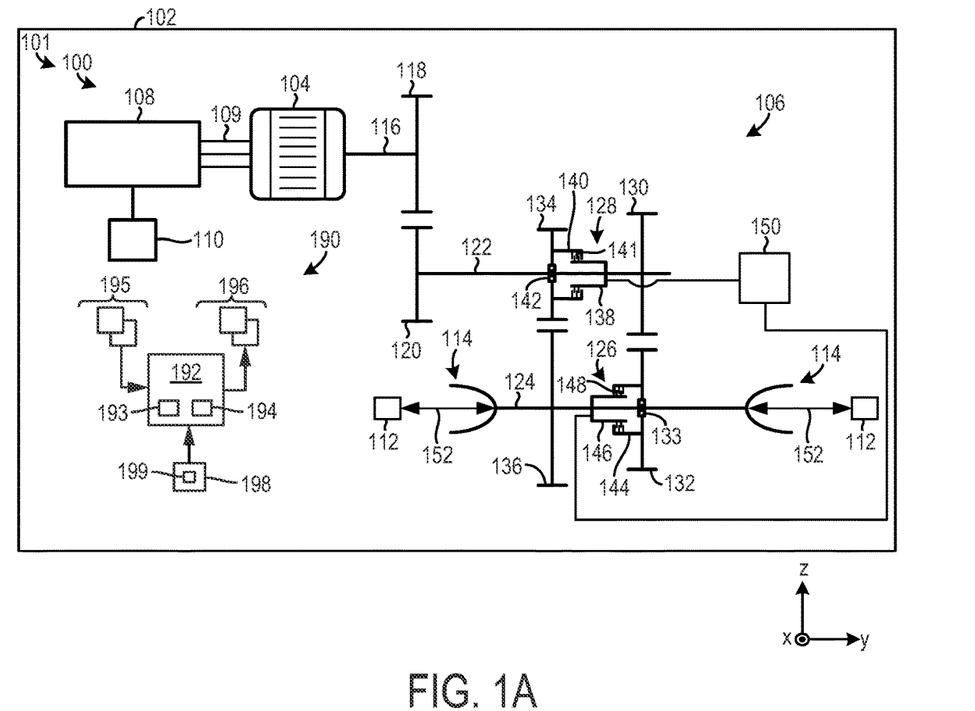
FIG. 1A is a schematic diagram of a first example of a transmission in an electric powertrain for a vehicle.

FIG. 1A shows a first example of an electric powertrain 100 in a system 101. The electric powertrain 100 may be included in a vehicle 102. The vehicle 102 may for example be an off-highway vehicle such as a wheel loader, an excavator, a dumper, a material handling vehicle, a tractor, a harvester, a mining vehicle, or the like. An off-highway vehicle is vehicle whose size, weight, and/or top speed precludes it from being driven on highways and other roadways, in some cases. The powertrain 100 includes a traction motor 104 and a transmission 106. In the illustrated example, the traction motor 104 is electrically coupled to an inverter 108 via an electrical connection 109 (e.g., multi-phase wires, bus bars, combinations thereof, and the like). As such, the traction motor 104 is an alternating current (AC) type motor in the illustrated example. To elaborate, the traction motor may be a multi-phase (e.g., three, six, or nine phase) AC motor. In one specific use case example, the traction motor may be a three phase AC motor that is less costly and more efficient than single phase type motors. However, in alternate examples, a direct current (DC) traction motor may be used in the electric powertrain 100.

The inverter 108 may be electrically connected to an energy storage device 110 (e.g., one or more traction batteries, capacitor(s), fuel cell(s), combinations thereof, and the like). As such, electrical energy may flow between the inverter and the energy storage device during drive operation and regeneration operation, when the motor is designed as a motor-generator.

The electric powertrain 100 may further include one or more drive axle assemblies 112 that are mechanically coupled to output interface(s) 114 which may be included in the transmission 106. The drive axle assemblies may specifically be a front drive axle assembly and a rear drive axle assembly, in one example. The drive axle assemblies may include differentials, axle shafts (e.g., half shafts) coupled to the associated differential, drive wheels coupled to the axle shafts), and the like. The drive wheels may be mounted on wheel hubs and may contact a driving surface while the vehicle is in operation.

The traction motor 104 may include components such as a rotor and a stator that electromagnetically interact during operation to generate motive power. Further in one example, the motor may be a motor-generator which is designed to generate electrical energy during regeneration operation.

The transmission 106 may include an input shaft 116 that is mechanically coupled (e.g., directly mechanically coupled) to a rotor shaft in the traction motor 104. Splines, bolts and flanges, combinations thereof, and/or the like may be used to form the mechanical connection between the rotor shaft and the input shaft 116. Inputs and outputs of the transmission generally denote the power flow occurring while the vehicle is operating under a drive condition where mechanical power is transferred from the traction motor to the drive wheels to propel the vehicle in a desired direction (e.g., forward drive direction or reverse drive direction). However, it will be appreciated that during regeneration operation, the mechanical power flow occurs in the reverse direction (i.e., from the drive wheels to the traction motor).

In the illustrated example, the input shaft 116 has a gear 118 fixedly coupled thereto. Fixedly coupling the components allows both components to co-rotate. Further, as illustrated, the gear 118 meshes with a gear 120 on a shaft 122 (e.g., idler shaft). The gear 120 is fixedly coupled to the shaft 122. However, other gear layouts and/or other mechanical connections may be established between the input shaft and the idler shaft, in other example.

The transmission 106 further includes an output shaft 124 in the illustrated embodiment. A first friction clutch 128 may be mounted to the shaft 122. A second friction clutch 126 may be mounted to the output shaft 124. The second friction clutch 126 may be associated with a second operating gear ratio formed between a gear 130 and a gear 132. The gear 132 may be idly mounted to the output shaft 124 via a bearing 133. As such, when the second friction clutch 126 is disengaged, the gear 132 and the output shaft 124 can independently rotate. Likewise, the first friction clutch 128 may be associated with a first operating gear ratio formed between a gear 134 and a gear 136. The second operating gear ratio may be greater than the first operating gear ratio. As such, the first operating gear ratio may be used at vehicle launch and during lower speed maneuvers. Conversely, the second operating gear ratio may be used during higher speed maneuvers. However, in other examples, the first operating gear ratio may be greater than the second operating gear ratio.

The first friction clutch 128 may include an inner plate carrier 138 (e.g., a hub) that is fixedly coupled to the shaft 122 and an outer plate carrier 140 (e.g., a drum) that is fixedly coupled to the gear 134. The plate carriers each may include sets of plates 141 that are designed to frictionally engage and disengage during clutch closing and opening, respectively. To elaborate, the plates (e.g., friction and spacer discs) may be interleaved to allow selective torque transfer therethrough. For instance, the plates may be splined to the carriers, in some examples. However, other attachment techniques for the plates and carriers have been contemplated. The gear 134 may be idly mounted on the shaft 122. For instance, a bearing 142 may be used to idly mount the gear 134 to the shaft 122. The bearings described herein may include outer races, inner races, roller elements (e.g., balls, cylinders, tapered cylinders, and the like). Idly mounting refers to the attachment of a gear to a shaft such that the gear and shaft are able to independently rotate. The gear 134 meshes with the gear 136 that is fixedly coupled to the output shaft 124, in the illustrated example.

The second friction clutch 126 may include an outer plate carrier 144 that is fixedly coupled to the gear 132, an inner plate carrier 146 that is fixedly coupled to the output shaft 124, and plates 148 in both of the carriers. As such, the second friction clutch 126 may have a similar construction to the first friction clutch 128.

The friction clutches 126, 128 may be wet friction clutches to reduce the temperature of the clutches during shifting events, to reduce the chance of the clutches experiencing over temperature conditions. The friction clutches 126, 128 may therefore, in such an example, receive lubricant (e.g., natural and/or synthetic oil) from a lubrication system 150. The lubrication system 150 may include a sump that collects the lubricant, a pump, lines, conduits, valves, and the like that route lubricant to the clutches and other components with lubrication needs such as bearings, gears, and the like, for instance. Still further, the lubrication system 150 may in one example be designed with hydraulic actuation circuits that enable the friction clutches to be hydraulically actuated. For instance, the friction clutches may include hydraulically actuated pistons that are in fluidic communication with the actuation circuit. However, in other examples, the hydraulic actuation circuits may be formed in a separate system that is distinct from the lubrication system or the friction clutches may be electro-mechanically and/or pneumatically actuated.

The friction clutches 126, 128 are positioned on different shafts in the transmission which may enable the transmission to achieve greater space efficiency and load distribution. However, in other examples, the clutches may be coaxially positioned on the same shaft.

The output interfaces 114 (e.g., splines, flanges, yokes, and the like) may be used to attach the output shaft 124 to downstream components. To elaborate, as indicated via arrows 152, a mechanical connection may be established between the output interfaces and the drive axle assemblies 112. Shafts, joints, gears, chains, combinations thereof, and the like may be used to establish the mechanical connection between the output interfaces and the drive axle assemblies.

It will be appreciated that the transmission 106 may include additional shafts, gears, and/or clutches which may have different layouts, in other examples. For instance, the transmission 106 may include a second idler shaft with another clutch mounted thereto and/or an additional shaft that functions as an output shaft. As such, the transmission 106 may have three or more speeds, in other examples. However, increasing the number of available operating gears in the transmission increases the transmission's size and complexity. Therefore, the transmission may specifically be a two-speed transmission to reduce the transmission size, complexity, and likelihood of component degradation. Using a two-speed transmission may be particularly suited for a traction motor due to motor having a wider power band than internal combustion engines, for instance.

The powertrain 100 may further include a control system 190 with a controller 192 as shown in FIG. 1A. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions that are executable by a processor for performing the methods and control techniques described herein as well as other variants that are anticipated but not specifically listed. As such, control techniques, methods, and the like expanded upon herein may be stored as instructions in non-transitory memory.

The controller 192 may receive various signals from sensors 195 coupled to various regions of the powertrain 100. For example, the sensors 195 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the traction motor 104. An input device 198 (e.g., accelerator pedal, brake pedal, drive mode selector, gear selector 199, combinations thereof, and the like) may further provide input signals indicative of an operator's intent for vehicle control. The gear selector 199 may include discrete positions such as drive and reverse as well as first gear and second gear that allow an operator to place the transmission in a forward drive mode, a reverse drive mode, a first gear mode, and a second gear mode. It will be appreciated, that when an operator places the transmission in a forward drive mode, the transmission may then automatically trigger power shifts based on transmission speed and load.

Upon receiving the signals from the various sensors 195 of FIG. 1A, the controller 192 processes the received signals, and employs various actuators 196 of powertrain and/or transmission components to adjust the components based on the received signals and instructions stored on the memory of controller 192. For example, the controller 192 may receive an accelerator pedal signal indicative of an operator's request for increased vehicle acceleration. In response, the controller 192 may command operation of the inverter 108 to adjust the motor's mechanical power output and increase the power delivered from the traction motor 104 to the multi-speed transmission 106. The controller 192 may, during certain operating conditions, be designed to send commands to the friction clutches 126, 128, to carry out a power shift where the clutches are simultaneously engaged and disengaged. For instance, a control command may be sent to the first friction clutch and in response to receiving the command, an actuator in the clutch may adjust the clutch based on the command for clutch engagement or disengagement. The other controllable components in the vehicle may function in a similar manner with regard to sensor signals, control commands, and actuator adjustment, for example.

Figure 1B:
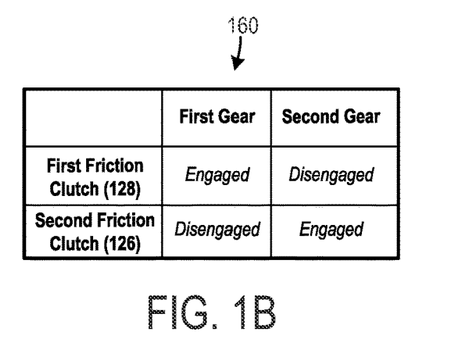
FIG. 1B shows a table that correlates operational gear and clutch engagement, in the transmission, depicted in FIG. 1A.
Figure 1C:
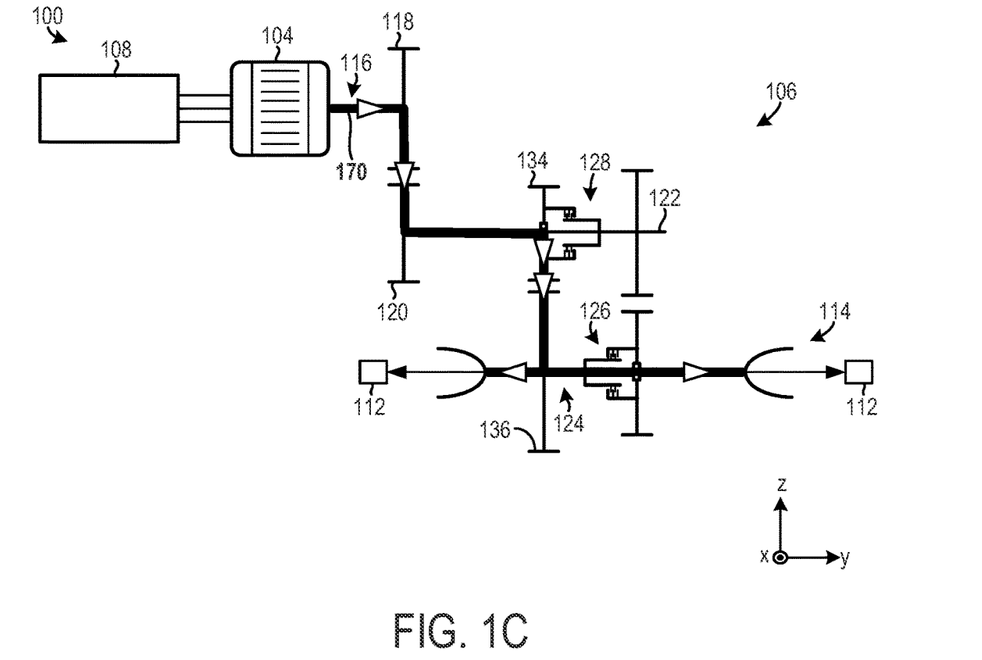
FIGS. 1C and 1D show mechanical power paths in the transmission in a first operating gear ratio and a second operating gear ratio, respectively, in the transmission depicted in FIG. 1A.
Figure 1D:
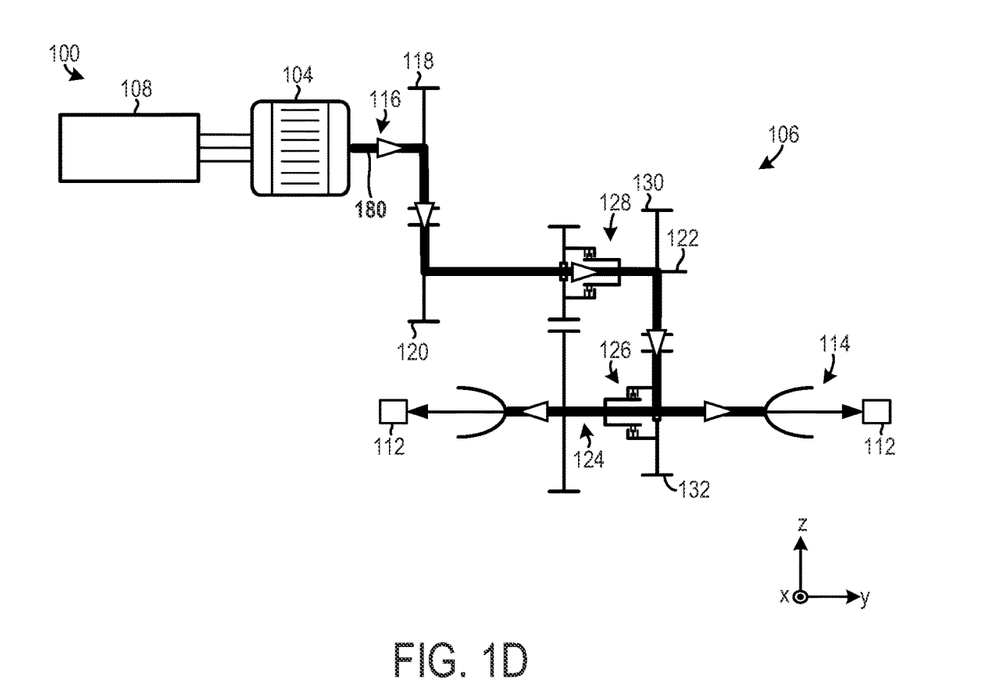
Figure 2A:
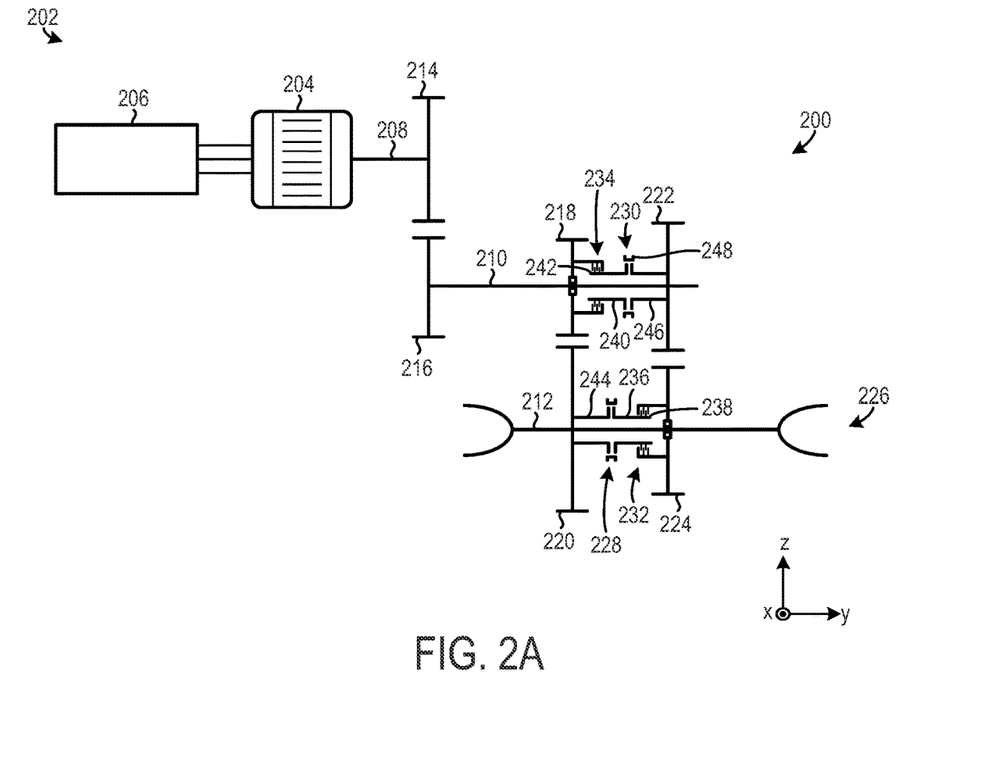
FIG. 2A is a schematic diagram of a second example of a transmission in an electric powertrain.

An axis system is provided in FIG. 1A as well as FIGS. 2A, 1C, and 1D, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The traction motor 104 may be designed to spin the rotor shaft in opposing directions which correspond to forward and reverse drive. Therefore, in such an example, the transmission 106 may be designed to operate with an equal number of forward and reverse driving gear modes, in one example. However, in alternate examples, the transmission may have an asymmetric number of forward and reverse gear ratios.

FIG. 1B shows a table 160 that indicates the configurations of the second friction clutch 126 and the first friction clutch 128 in the first gear mode and the second gear mode. As previously indicated, in the first gear mode, the first friction clutch is engaged and the second friction clutch is disengaged and conversely, in the second gear mode the first friction clutch is disengaged and the second friction clutch is engaged.

FIGS. 1C and 1D show mechanical power paths 170 and 180 that occur in the transmission 106 of the electric powertrain 100 in the first operating gear and the second operating gear, respectively. In both FIGS. 1C and 1D, the inverter 108 transfers electrical energy to the traction motor 104 and the traction motor generates mechanical power and inputs this power into the transmission 106. However, as previously discussed the inverter may be omitted from the powertrain, in other embodiments.

In both of the mechanical power paths 170 and 180, power travels from the traction motor 104 to the input shaft 116, from the input shaft to the gear 118, from the gear 118 to the gear 120, and from the gear 120 to the shaft 122.

In the power path 170, shown in FIG. 1C, power then travels from the shaft 122 to the gear 134 by way of the first friction clutch 128, from the gear 134 to the gear 136, from the gear 136 to the output shaft 124, and from the output shaft 124 to the drive axle assemblies 112.

On the other hand, in the power path 180, shown in FIG. 1D, first friction clutch 128 power then travels from the shaft 122 to the gear 130, from the gear 130 to the gear 132, from the gear 132 to the output shaft 124 by way of the second friction clutch 126, and from the output shaft 124 to the drive axle assemblies 112.

FIG. 2A shows another example of a transmission 200 in an electric powertrain 202. The transmission 200 within the electric powertrain 202 shown in FIG. 2 shares some component which are similar in function and/or structure to the transmission 106 and the electric powertrain 100 depicted in FIG. 1A. For instance, the electric powertrain 202 again includes a traction motor 204 and an inverter 206 and the transmission includes an input shaft 208, a shaft 210, an output shaft 212, a gear 214, a gear 216, a gear 218, a gear 220, a gear 222, a gear 224, and output interfaces 226. Repeated description of the overlapping components is omitted for concision.

The transmission 200 shown in FIG. 2A includes a first synchronizer 230 and a second synchronizer 228. The second synchronizer 228 is positioned adjacent to and directly coupled to a second friction clutch 232 and the first synchronizer 230 is likewise positioned adjacent to and directly coupled to a first friction clutch 234. To elaborate, a first hollow shaft 236 may be used to attach the second synchronizer 228 to an inner plate carrier 238 and a second hollow shaft 240 may be used to attach the first synchronizer 230 to the inner plate carrier 242. Further, hollow shafts 244 and 246 may be used to attach mating splines or toothed faces in the synchronizers 228, 230, respectively to the gear 220 and the gear 222, respectively. The synchronizers 228, 230 may each include a sleeve 248 as well as other components such as one or more synchronizer rings and the like. The synchronizers 228, 230 are configured to bring the shaft speeds together to enable alignment and meshing of the splines or teeth in the clutch. Further, the synchronizers may be electromechanically, hydraulically, and/or pneumatically actuated. For instance, the sleeves 248 may be adjusted via shift forks or other suitable actuator. The use of synchronizers in the transmission 200 allows the slip speed of the clutch to be very low and in some cases equal or approach zero when the clutch is open, thereby reducing the drag power loss.

Figure 2B:
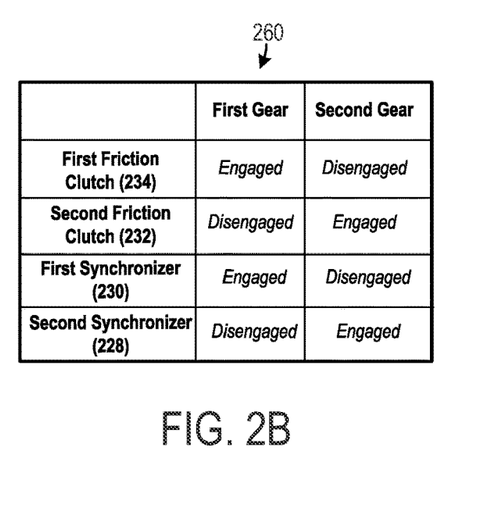
FIG. 2B shows a table that correlates operational gear and clutch engagement, in the transmission, depicted in FIG. 2A.

FIG. 2B shows a table 260 that indicates the configurations of the second friction clutch 232, the second synchronizer 228, the first friction clutch 234, and the first synchronizer 230 in the first gear mode and the second gear mode. In the first gear mode, the second friction clutch 232 is engaged, the second synchronizer 228 is engaged, the first friction clutch 234 is disengaged, and the first synchronizer 230 is disengaged. Conversely, in the second gear mode, the second friction clutch 232 is disengaged, the second synchronizer 228 is disengaged, the first friction clutch 234 is engaged, and the first synchronizer 230 is engaged.

Figure 3A:
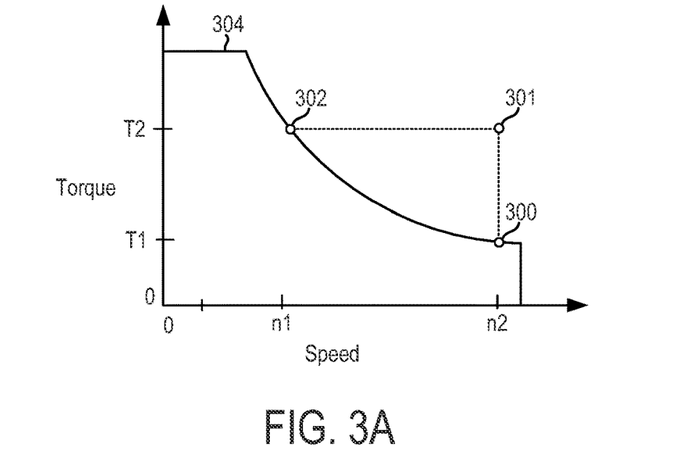
FIGS. 3A and 3B show graphs of torque vs speed as examples of a power shifting strategy in an electric powertrain.
Figure 3B:
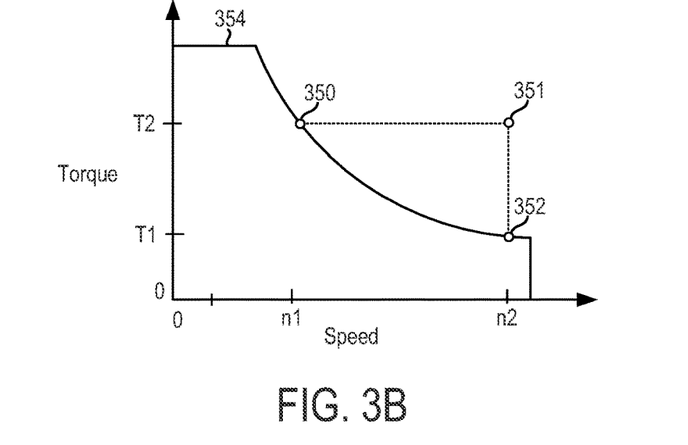

FIGS. 3A and 3B show prophetic torque vs speed graphs corresponding to an exemplary upshift event and a downshift event, respectively. Although specific numerical values are not provided on the ordinates and the abscissas, the torque and speed increase in the direction of the arrows.

FIG. 3A specifically depicts load points on an example electromotor curve during an upshift (e.g., full throttle upshift) from a first gear (e.g., first friction clutch closed and second friction clutch open, at point 300) to second gear (e.g., first friction clutch open and second friction clutch closed at point 302). As described herein an open clutch configuration denotes that the torque transfer through the clutch is inhibited and a closed clutch configuration denotes that torque transfer through the clutch is occurring. Further, as described herein, a full throttle upshift is a shift event when an accelerator pedal has been depressed to an extent that generates an acceleration requests that is equal to or greater than the available acceleration in the powertrain given the current operating conditions.

A maximum continuous power curve 304 for the traction motor in the powertrain is illustrated in FIG. 3A. The maximum continuous power curve 304 indicates the upper threshold of power at which the traction can be operated continuously. Therefore, operation of the motor above the continuous power threshold increases the temperature of the motor and specifically the end windings, thereby increasing the chance of motor degradation. However, the motor may be peaked above the continuous power curve for a comparatively short duration while avoiding heating the motor beyond a desired value (e.g., a temperature threshold indicative of an over-temperature condition). This operation is referred to as motor peaking. Motor peaking may not be deployed to significantly accelerate the vehicle due to the short duration it can be used due to heat generated during peaking. However, the inventors have unexpectedly recognized that motor peaking can be deployed during shifting transient due to their comparative short duration (e.g., less than three seconds (s)). As such peaking, which is elaborate upon below is deployed during shifting transients in various powertrain control strategies set forth herein. Further, it will be appreciated that to peak the motor the inverter may transfer an amount of electrical energy to the motor that is greater than the amount needed to maintain the motor at maximum continuous torque output.

The upshift, depicted in FIG. 3A, begins with a torque overlap phase during which the torque path is transferred from the first friction clutch to the second friction clutch. During the torque overlap phase the clutch pressure in the first friction clutch is reduced while the clutch pressure in the second friction clutch is increased. As such, the torque through the first friction clutch is reduced while the torque through the second friction clutch is increased.

To diminish or completely avoid a torque dip, the traction motor is peaked during the overlap phase of the upshift. In particular, the traction motor torque is increased (via peaking) from point 300 to point 301, during the overlap phase. To elaborate, the traction motor torque from point 300 to point 301 is greater than the motor's continuous torque threshold.

The torque dip that occurs in previous transmissions at the end of the overlap phase due to the transmission torque ratio already equaling the ratio of the second gear, but the speeds still equaling the ratio of the first gear. To elaborate, in previous transmissions, the second gear ratio is a factor equal to the spread lower than the first gear ratio, as such the torque dip is a factor equal to the spread that appears at the output. To avoid a decrease in the transmission's output torque, the peak traction motor torque is higher than the continuous torque by a factor that is greater than or equal to a spread between the first operating gear ratio and the second operating gear ratio. For instance, in one use-case example, a spread between the first and second operating gear ratios may be 2.75 and therefore to avoid a torque drop, the peak traction motor torque is 2.75 times higher than the maximum continuous motor torque. However, numerous gear ratio spreads have been contemplated and the gear ratio spread may be selected based on factors such as the target performance characteristics of the transmission, vehicle weight, traction motor configuration, and the like. However, when the peak motor torque is higher than the maximum continuous motor torque but not by a factor that is greater than or equal to the gear ratio spread, the motor may still be peaked to diminish the drop in transmission output torque and enhance shifting performance.

FIG. 3B specifically depicts load points on an example electromotor curve during a downshift (e.g., full throttle downshift) from the second gear (e.g., first friction clutch open and second friction clutch closed, at point 350) to the first gear (e.g., first friction clutch closed and second friction clutch open at point 352).

The maximum continuous power curve 354 for the traction motor in the powertrain is again illustrated in FIG. 3B. The downshift begins with a synchronization phase which occurs from point 350 to point 351. During the synchronization phase, the second friction clutch is slipped to allow the speed of the transmission input to be increased. Further, during the synchronization phase, the traction motor is peaked to maintain the traction motor torque constant. As previously discussed peaking the motor involves operating the motor above its continuous power threshold by delivering additional electrical power to the motor. In other examples, the motor may be peaked but the torque may slightly decrease, due to a large spread between the gear ratios. In either case, the shifting smoothness is increased by decreasing or avoiding torque interruptions during shifting transients.

Next, during the downshift, a torque overlap phase occurs (from point 351 to point 352), in which during which the torque is transferred from the second friction clutch to the first friction clutch. Further, during the overlap phase, the traction motor torque is gradually reduced as the gear ratio is increased, keeping the transmission's output torque constant. As the gear ratio is increasing during the torque overlap phase, the torque dip is reduced (e.g., avoided) and at the end of the overlap phase the output torque will be equal to the initial output torque again.

The transmission shafts, gears, bearings, and friction clutches are designed to allow for traction motor peaking during shifting transients. For instance, the number of friction and separator plates, the separator plate thickness and/or the plate surface area (e.g., diameters) may be increased to allow for higher thermal loading. Therefore, the clutch assemblies (e.g., drum, hub, discs, and the like) may be larger.

Figure 4A:
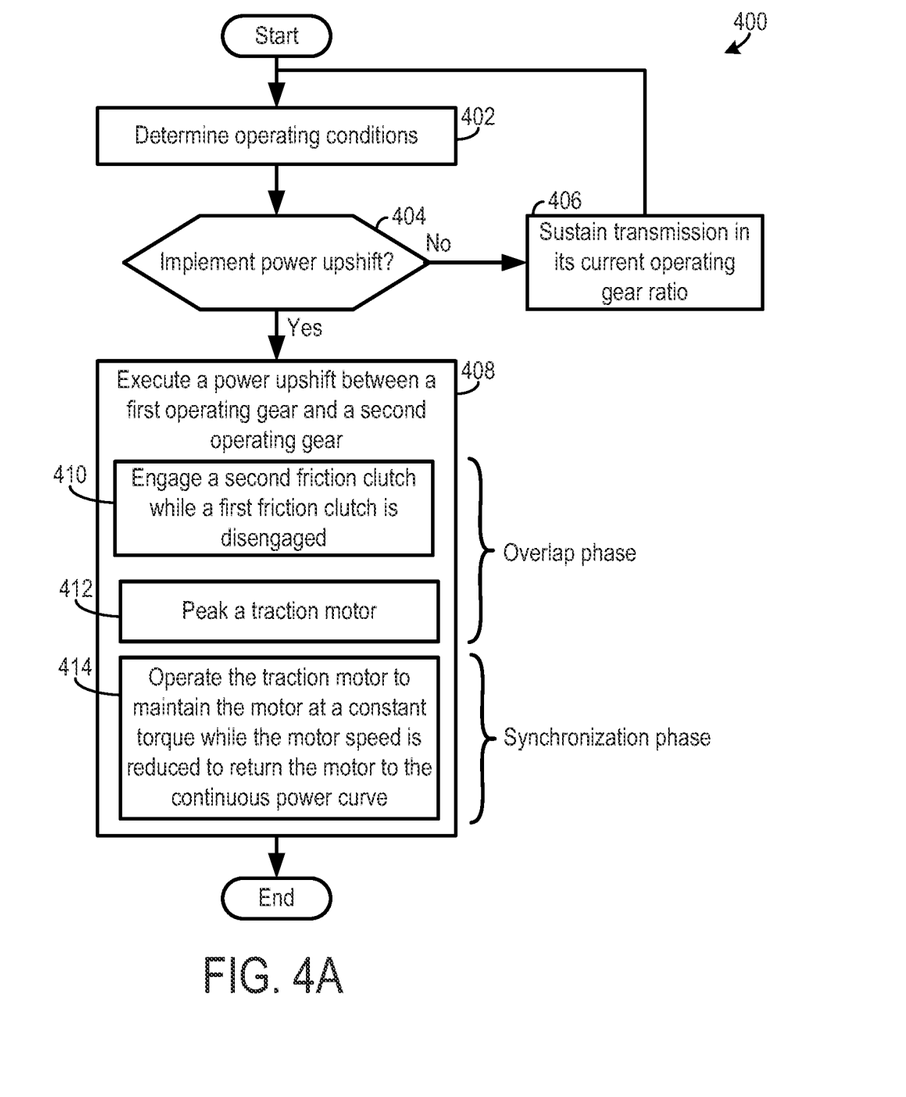
FIGS. 4A and 4B are flow charts of methods for power shifting an electric powertrain.
Figure 4B:
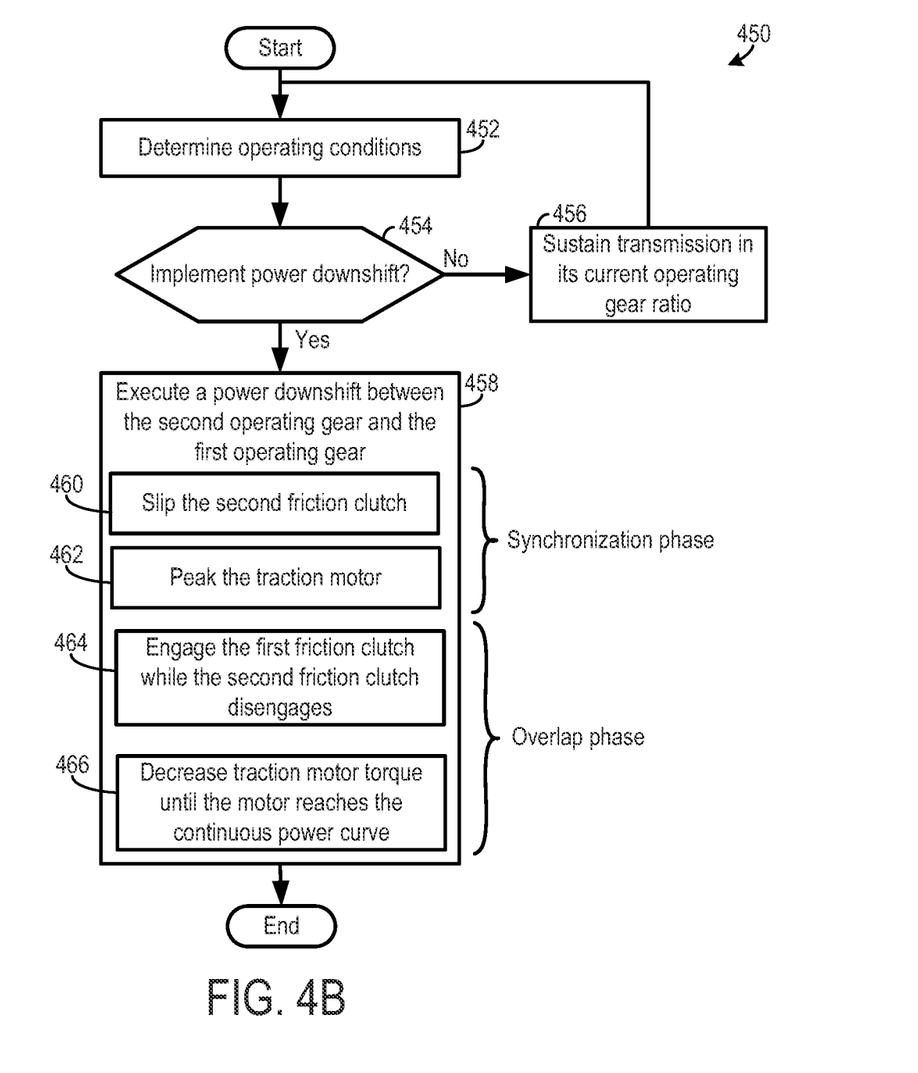

FIGS. 4A and 4B show methods 402 and 450, respectively, for operation of an electric powertrain. Specifically, FIG. 4A shows an upshift method and FIG. 4B conversely shows a downshift technique. The methods 400 and 450 may be carried out by the electric powertrain 100 shown in FIG. 1A, in one example. In other examples, the methods may be implemented via the electric powertrain 202 shown in FIG. 2A, by other suitable powertrains, or combinations of the powertrains described herein. Furthermore, the methods 400 and 450 may be implemented by a controller that includes memory holding instructions for the method steps that are executable by a processor, as previously indicated.

The method 400 illustrated in FIG. 4A includes at 402, determining operating conditions. The operating conditions may include input device position (e.g., gearshift lever position), clutch configuration, accelerator pedal position, transmission input/output speed, motor speed, vehicle speed, vehicle load, ambient temperature, and the like. The operating conditions may be ascertained via sensor inputs, modeling, look-up tables, and/or other suitable techniques.

Next at 404, the method includes judging if a power up-shift in the transmission should be implemented. Such a determination may be automatically carried out responsive to vehicle speed exceeding a threshold value and/or vehicle load dropping below a threshold value, in one example. In other examples, operator interaction with gear selector may initiate the power upshift.

If it is determined that a power upshift should not occur (NO at 404) the method moves to 406 where the method includes sustaining the current transmission operating strategy. For instance, the transmission may be maintained in its current operating gear ratio (e.g., the first gear ratio).

Conversely, if it is determined that a power upshift should occur (YES at 404) the method moves to 408 where the method includes executing a power upshift from a first operating gear to a second operating gear.

Executing the power upshift includes steps 410-414. Steps 410-412 occur during an overlap phase of the upshift and step 414 occurs during a synchronization phase of the upshift.

At 410, the method includes engaging a second friction clutch while a first friction clutch is disengaged. In other words, torque transfer through the second clutch is increased while torque transfer through the first friction clutch is reduced. This clutch engagement may be initiated via hydraulic actuators with pistons that receive pressurized fluid (e.g., oil) from a hydraulic system. However, in other examples, the friction clutches may be electromechanically actuated via solenoids, for instance.

At 412, the method includes peaking a traction motor. It will be appreciated that steps 410 and 412 occur at overlapping (e.g., concurrent) times. Peaking the traction motor may specifically include peaking the traction motor to maintain the torque at the output of the transmission at a substantially constant value. In this way, torque dips during shifting is avoided. However, in other examples, the traction motor may be peaked and the output torque may slightly drop due to the constraints of the motor and/or the spread between the first and second gear ratios. As indicated above, peaking the motor includes operating the motor above a threshold continuous power curve. Further, it will be appreciated that the motor may be operated on a threshold continuous power curve prior and subsequent to peaking of the motor.

At 414, the method includes operating the traction motor to maintain the motor at a constant torque while the motor speed is reduced to return the motor to the threshold continuous power curve. In this way, the motor is peaked for a relatively short duration to avoid thermal degradation of the motor. For example, the motor may be peaked for less than three seconds, in one specific example. In particular, the traction motor may be peaked for one second or less. In this way, the chance of motor thermal degradation is significantly decreased (e.g., avoided). Method 400 allows the smoothness of upshifting to be increased while avoiding motor thermal degradation, if desired. After 414, the method ends.

When the transmission includes synchronizers such as in the transmission 200 depicted in FIG. 2A. Executing the power upshift between the first operating gear and the second operating gear may include, prior to step 410, engaging the second synchronizer while the first synchronizer remains engaged, and subsequent to step 414 disengaging the first synchronizer while the second synchronizer remains engaged.

The method 450, shown in FIG. 4B, illustrates a downshifting strategy. At 452, the method includes determining operating conditions. The operating conditions may be determined in a similar manner to step 402, shown in FIG. 4A.

Next, method 450 includes step 454 where the method includes determining if a power downshift should be implemented. Such a determination may be automatically carried out responsive to vehicle speed decreasing below a threshold value and/or vehicle load increasing above a threshold value, in one example. In other examples, operator interaction with gear selector may initiate the power downshift.

If it is determined that a power downshift should not occur (NO at 454) the method moves to 456 where the method includes sustaining the current transmission operating strategy. For instance, the transmission may be maintained in its current operating gear ratio (e.g., the second gear ratio).

Conversely, if it is determined that a power upshift should occur (YES at 454) the method moves to 458 where the method includes executing a power downshift from the second operating gear to the first operating gear. Executing the power downshift includes steps 460-466. Steps 460-462 are specifically implemented during a synchronization phase and steps 464-466 are implemented during an overlap phase.

At 460, the method includes slipping the second friction clutch while all of the torque in the transmission is traveling through the second friction clutch. Next at 462, the method includes peaking the traction motor. It will be appreciated that steps 460 and 462 occur at overlapping (e.g., concurrent) times. Specifically, in one example, the traction motor may be peaked to maintain the transmission's output torque at a substantially constant value. However, in other examples, the motor may be peaked to reduce a torque dip in the transmission's output. In this way, the downshift smoothly occurs, thereby increasing shifting performance.

Next at 464, the method includes engaging the first friction clutch while the second friction clutch disengages. To elaborate, torque is handed off from the second friction clutch to the first friction clutch.

Next at 466, the method includes decreasing traction motor torque until the motor returns to the continuous power curve. It will be appreciated that steps 464 and 466 occur at overlapping (e.g., concurrent) times. In this way, the motor is peaked for a relatively short time during a downshifting transient to enhance shifting performance. After 466, the method ends.

Figure 5A:
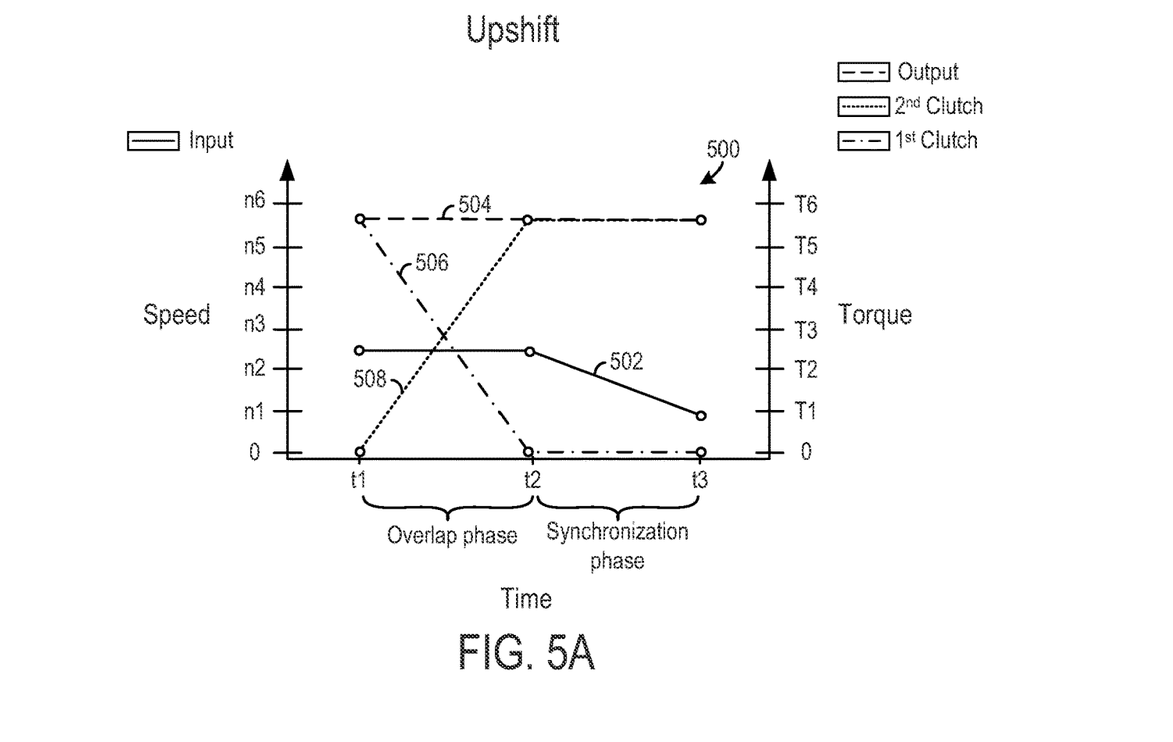
FIGS. 5A and 5B are graphs illustrating exemplary upshifting and downshifting strategies in an electric powertrain.
Figure 5B:
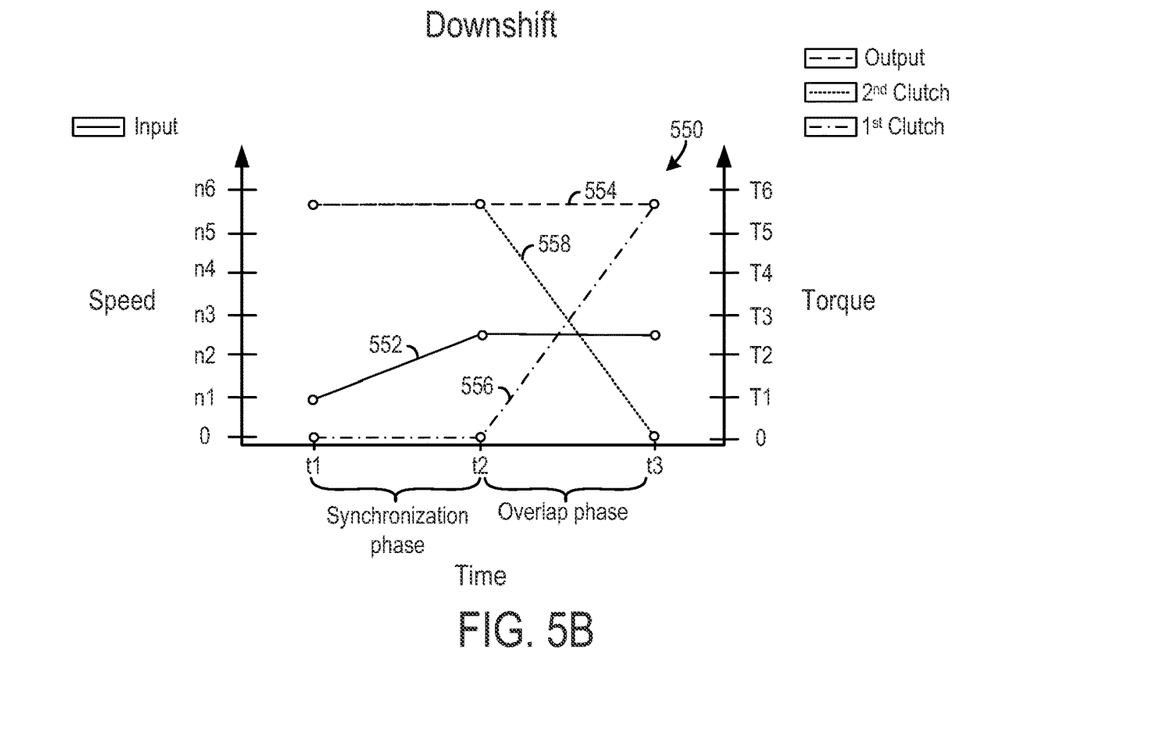

FIGS. 5A and 5B show prophetic graphs 500 and 550 that depict the torque and speed of various transmission components vs time. Although specific values are not provided in FIGS. 5A and 5B, time increases from left to right and speed and torque increase in the direction of the arrows on the ordinates, respectively.

Graph 500 specifically indicates a transmission input speed 502, a transmission output torque 504, a first friction clutch torque 506, and a second friction clutch torque 508. The upshift begins at t1. Further, the overlap phase occurs between t1 and t2 and the synchronization phase occurs between t2 and t3.

As shown, the torque of the second clutch increases as the torque of the first clutch decreases during the overlap phase while the input speed and the output torque remain constant. Next during the synchronization phase, the input speed is decreased while the output torque remains constant.

Graph 550 again indicates a transmission input speed 552, a transmission output torque 554, a first friction clutch torque 556, and a second friction clutch torque 558.

The downshift begins at t1. Further, the synchronization phase occurs between t1 and t2 and the overlap phase occurs between t2 and t3. During the synchronization phase, the speed of the input increases while the output torque and the second clutch torque are held at a constant speed and the torque of the first clutch is zero.

In both graphs 500 and 550 the input speed and the output torque of the transmission are held constant during overlap phases to enable the power shifting to smoothly unfold. Transmission efficiency is increased as a result.

The technical effect of the electric powertrain operating methods described herein is to increase shifting performance by decreasing or avoiding, in some cases, drops in torque during shifting transients (e.g., upshifts and downshifts) by temporarily operating the traction motor under a peak condition which is greater than a continuous power curve of the traction motor.

FIGS. 1A, 1C, 1D, and 2A show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a method is provided that comprises receiving a first shift command to initiate a first shift event in a transmission; in response to receiving the first shift command, engaging a second friction clutch while disengaging a first friction clutch to transition from a first operating gear ratio to a second operating gear ratio; and during the gear ratio transition, operating a traction motor under a peak condition; wherein the peak condition includes a condition where a torque of the traction motor exceeds a maximum continuous torque threshold. In one example the method may further comprise receiving a second shift command to initiate a second shift event; in response to receiving the second shift command, engaging the first friction clutch while disengaging the second friction clutch to transition from the second operating gear ratio to the first operating gear ratio; and operating the traction motor under the peak condition. The method may further comprise, in one example, during the first shift event, decreasing a torque of the traction motor to operate the traction motor at or below the maximum continuous torque threshold. Further, in one example, the transmission may include a first synchronizer directly coupled to the first friction clutch and a second synchronizer directly coupled to the second friction clutch; and the method may further comprise in one example, the method further comprises: prior to engaging the first friction clutch while disengaging the second friction clutch, engaging the first synchronizer while sustaining engagement of the first synchronizer; and subsequent to engaging the second friction clutch while disengaging the first friction clutch, disengaging the first synchronizer while sustaining engagement of the second synchronizer.

In another aspect, an electric powertrain system is provided that comprises a first friction clutch configured to selectively engage a first operating gear ratio in a transmission; a second friction clutch configured to selectively engage a second operating gear ratio; and a controller including instructions that when executed, in response to receiving a shift command, cause the controller to: engage the second friction clutch and disengage the first friction clutch at an overlapping interval to implement a first power shift event; and during the overlapping interval, operating a traction motor under a peak condition; wherein the peak condition includes a condition where a torque of the traction motor exceeds a maximum continuous torque threshold; and wherein the second operating gear ratio is greater than the first operating gear ratio.

In yet another aspect, a method for operation of an electric powertrain system, is provided that comprises operating a traction motor above a maximum continuous torque threshold, during a torque hand-off between a second wet friction clutch and a first wet friction clutch in a power shift event; and operating the traction motor at or below the maximum continuous torque threshold prior and subsequent to the power shift event.

In any of the aspects or combinations of the aspects, a torque of an output of the transmission that includes the first and second friction clutches may be maintained at a substantially constant value during the engagement of the first friction clutch and the disengagement of the second friction clutch.

In any of the aspects or combinations of the aspects, the second operating gear ratio may be greater than the first operating gear ratio.

In any of the aspects or combinations of the aspects, the first shift command that triggers initiation of the first shift event may be automatically generated based on a change in vehicle speed and/or load.

In any of the aspects or combinations of the aspects, the transmission may include an output shaft configured to couple to a front axle assembly and a rear axle assembly.

In any of the aspects or combinations of the aspects, operating the traction motor under the peak condition may occur during an overlap phase of the first power shift event where torque handoff between the first friction clutch and the second friction clutch occurs.

In any of the aspects or combinations of the aspects, the electric powertrain system may further comprise a first synchronizer directly coupled to the first friction clutch; and a second synchronizer directly coupled to the second friction clutch.

In any of the aspects or combinations of the aspects, the controller may further include instructions that when executed, prior to the engagement of the second friction clutch and disengagement of the first friction clutch, cause the controller to: engage the second synchronizer while engagement of the first synchronizer is maintained; and the controller further includes instructions that when executed, subsequent to the engagement of the second friction clutch and disengagement of the first friction clutch, cause the controller to: disengage the first synchronizer while engagement of the second synchronizer is maintained.

In any of the aspects or combinations of the aspects, the transmission may be a two-speed transmission.

In any of the aspects or combinations of the aspects, the electric powertrain system may be included in an all-electric vehicle.

In any of the aspects or combinations of the aspects, the electric powertrain system may be included in an off-highway vehicle.

In any of the aspects or combinations of the aspects, operating the traction motor above a maximum continuous torque threshold may include operating the traction motor above the maximum continuous torque threshold to maintain an output torque of a transmission at a substantially constant value, wherein the first and second wet friction clutches are included in the transmission.

In any of the aspects or combinations of the aspects, the first wet friction clutch may be associated with first gear ratio and the second wet friction clutch is associated with a second gear ratio and wherein the first gear ratio is not equivalent to the second gear ratio.

In any of the aspects or combinations of the aspects, a duration of the power shift event may be less than three seconds (s).

In another representation, an electric drive system is provided that includes a pair of friction clutches, a traction motor, and a controller that including instructions that when executed during a power shift between the pair of friction clutches, cause the controller to transiently increase a torque produced by the traction motor above a continuous torque threshold.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines and/or internal combustion engines. The subject matter of the present disclosure includes all novel and non-obvious combinations and sub-combinations of the various systems and configurations, and other features, functions, and/or properties disclosed herein.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the electric drive unit and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
receiving a first shift command to initiate a first shift event in a transmission;
in response to receiving the first shift command, engaging a second friction clutch while disengaging a first friction clutch to transition from a first operating gear ratio to a second operating gear ratio; and
during the gear ratio transition, operating a traction motor under a peak condition;
wherein the peak condition includes a condition where a torque of the traction motor exceeds a maximum continuous torque threshold.

2. The method of claim 1, wherein a torque of an output of the transmission that includes the first and second friction clutches is maintained at a substantially constant value during the engagement of the first friction clutch and the disengagement of the second friction clutch.

3. The method of claim 1, wherein the second operating gear ratio is greater than the first operating gear ratio.

4. The method of claim 3, further comprising:
receiving a second shift command to initiate a second shift event;
in response to receiving the second shift command, engaging the first friction clutch while disengaging the second friction clutch to transition from the second operating gear ratio to the first operating gear ratio; and
operating the traction motor under the peak condition.

5. The method of claim 4, wherein:
the transmission includes a first synchronizer directly coupled to the first friction clutch and a second synchronizer directly coupled to the second friction clutch; and
the method further comprises:
prior to engaging the second friction clutch while disengaging the first friction clutch, engaging the second synchronizer while sustaining engagement of the first synchronizer; and
subsequent to engaging the second friction clutch while disengaging the first friction clutch, disengaging the first synchronizer while sustaining engagement of the second synchronizer.

6. The method of claim 1, further comprising, during the first shift event, decreasing a torque of the traction motor to operate the traction motor at or below the maximum continuous torque threshold.

7. The method of claim 1, wherein the first shift command that triggers initiation of the first shift event is automatically generated based on at least one of a change in vehicle speed and a change in vehicle load.

8. The method of claim 1, wherein the traction motor is a three-phase electric motor.

9. The method of claim 1, wherein the transmission includes an output shaft configured to couple to a front axle assembly and a rear axle assembly.

10. An electric powertrain system, comprising:
a first friction clutch configured to selectively engage a first operating gear ratio in a transmission;
a second friction clutch configured to selectively engage a second operating gear ratio; and
a controller including instructions that when executed, in response to receiving a shift command, cause the controller to:
engage the second friction clutch and disengage the first friction clutch at an overlapping interval to implement a first power shift event; and
during the overlapping interval, operate a traction motor under a peak condition;
wherein the peak condition includes a condition where a torque of the traction motor exceeds a maximum continuous torque threshold; and
wherein the second operating gear ratio is greater than the first operating gear ratio.

11. The electric powertrain system of claim 10, wherein operating the traction motor under the peak condition occurs during an overlap phase of the first power shift event where torque handoff between the first friction clutch and the second friction clutch occurs.

12. The electric powertrain system of claim 10, further comprising:
a first synchronizer directly coupled to the first friction clutch; and
a second synchronizer directly coupled to the second friction clutch.

13. The electric powertrain system of claim 12, wherein:
the controller further includes instructions that when executed, prior to the engagement of the second friction clutch and disengagement of the first friction clutch, cause the controller to:
engage the second synchronizer while engagement of the first synchronizer is maintained; and
the controller further includes instructions that when executed, subsequent to the engagement of the second friction clutch and disengagement of the first friction clutch, cause the controller to:
disengage the first synchronizer while engagement of the second synchronizer is maintained.

14. The electric powertrain system of claim 10, wherein the transmission is a two-speed transmission.

15. The electric powertrain system of claim 10, wherein the electric powertrain system is included in an all-electric vehicle.

16. The electric powertrain system of claim 10, wherein the electric powertrain system is included in an off-highway vehicle.

17. A method for operation of an electric powertrain system, comprising:
operating a traction motor above a maximum continuous torque threshold, during a torque hand-off between a second wet friction clutch and a first wet friction clutch in a power shift event; and operating the traction motor at or below the maximum continuous torque threshold prior and subsequent to the power shift event.

18. The method of claim 17, wherein operating the traction motor above the maximum continuous torque threshold includes operating the traction motor above the maximum continuous torque threshold to maintain an output torque of a transmission at a substantially constant value, wherein the first and second wet friction clutches are included in the transmission.

19. The method of claim 17, wherein the first wet friction clutch is associated with a first gear ratio and the second wet friction clutch is associated with a second gear ratio, and wherein the first gear ratio is not equivalent to the second gear ratio.

20. The method of claim 17, wherein a duration of the power shift event is less than three seconds (s).

* * * * *